(12) United States Patent
Sanchez Perez et al.

(10) Patent No.: US 10,047,665 B2
(45) Date of Patent: Aug. 14, 2018

(54) METHODS AND SYSTEMS FOR BOOST CONTROL

(71) Applicant: Ford Global Technologies, LLC, Dearborn, MI (US)

(72) Inventors: Arturo del Refugio Sanchez Perez, Mexico City (MX); Daniel Andres Ramos Coria, Santa Fe (MX); Rodrigo Felix, Atizapan de Zaragoza (MX); Artemio Magaña, Benito Juárez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/403,048

(22) Filed: Jan. 10, 2017

(65) Prior Publication Data

US 2017/0122190 A1 May 4, 2017

Related U.S. Application Data

(63) Continuation of application No. 14/619,733, filed on Feb. 11, 2015, now Pat. No. 9,540,989.

(51) Int. Cl.
| | |
|---|---|
| *F02B 37/14* | (2006.01) |
| *F02B 37/10* | (2006.01) |
| *F02B 37/18* | (2006.01) |
| *F02D 41/00* | (2006.01) |
| *F02D 41/02* | (2006.01) |
| *F02D 41/08* | (2006.01) |

(52) U.S. Cl.
CPC .............. *F02B 37/14* (2013.01); *F02B 37/10* (2013.01); *F02B 37/18* (2013.01); *F02D 41/0007* (2013.01); *F02D 41/023* (2013.01); *F02D 41/08* (2013.01); *F02D 2200/602* (2013.01); *F02D 2200/703* (2013.01); *Y02T 10/144* (2013.01)

(58) Field of Classification Search
CPC .......... F02B 37/14; F02B 37/10; F02B 37/18; F02D 41/0007; F02D 41/023; F02D 41/08; F02D 2200/602; F02D 2200/703; Y02T 10/144
See application file for complete search history.

(56) References Cited

U.S. PATENT DOCUMENTS

| | | |
|---|---|---|
| 3,487,482 A | 1/1970 | Maljanian |
| 3,521,446 A | 7/1970 | Maljanian |
| 5,906,098 A | 5/1999 | Wollenweber et al. |

(Continued)

FOREIGN PATENT DOCUMENTS

| | | |
|---|---|---|
| CN | 201003421 Y | 1/2008 |
| JP | 2008115792 A | 5/2008 |
| WO | 2013135714 A2 | 9/2013 |

*Primary Examiner* — Joseph Dallo
(74) *Attorney, Agent, or Firm* — Julia Voutyras; McCoy Russell LLP (57) ABSTRACT

Methods and systems are provided for adjusting operation of an electric motor coupled to a compressor at high altitude engine operation. In one example, the method may include adjusting a ratio of electric compressor assist provided by an electric motor to an intake compressor relative to turbine assist provided via a wastegate during engine idling conditions as well as during transmission gearshifts. The method allows for engine idle speed and torque to be maintained at high altitudes while reducing sluggish boost behavior.

20 Claims, 4 Drawing Sheets

(56) References Cited

U.S. PATENT DOCUMENTS

| | | | |
|---|---|---|---|
| 5,956,960 A * | 9/1999 | Niggeman | B64D 13/06 |
| | | | 60/785 |
| 6,134,888 A | 10/2000 | Zimmer et al. | |
| 6,415,606 B1 * | 7/2002 | Bowman | F02B 37/10 |
| | | | 123/565 |
| 6,430,515 B1 | 8/2002 | Sanyal et al. | |
| 6,634,447 B1 * | 10/2003 | Matsubara | B60K 6/485 |
| | | | 180/65.26 |
| 6,705,084 B2 | 3/2004 | Allen et al. | |
| 7,921,944 B2 | 4/2011 | Russell et al. | |
| 2004/0216458 A1 | 11/2004 | Spooner | |
| 2008/0147259 A1 * | 6/2008 | Choi | B60L 11/12 |
| | | | 701/22 |
| 2010/0051363 A1 | 3/2010 | Inoue et al. | |
| 2013/0204510 A1 | 8/2013 | Brinkmann et al. | |
| 2013/0213351 A1 | 8/2013 | Kitsukawa et al. | |
| 2014/0305412 A1 | 10/2014 | Ahms | |
| 2014/0305413 A1 | 10/2014 | Ahms | |
| 2016/0177813 A1 | 6/2016 | Styles et al. | |

\* cited by examiner

METHODS AND SYSTEMS FOR BOOST CONTROL

CROSS-REFERENCE TO RELATED APPLICATIONS

The present application is a continuation of U.S. patent application Ser. No. 14/619,733 entitled "METHODS AND SYSTEMS FOR BOOST CONTROL," filed on Feb. 11, 2015, now U.S. Pat. No. 9,540,989, the entire contents of which are incorporated herein by reference for all purposes.

FIELD

The present application relates to methods and systems for improving boost output of an engine system configured with a turbocharger having electric compressor assist, particularly at higher altitude conditions.

BACKGROUND AND SUMMARY

Engine systems may be configured with boosting devices, such as turbochargers or superchargers, for providing a boosted aircharge and improving peak power output. The use of a compressor allows a smaller displacement engine to provide as much power as a larger displacement engine, but with additional fuel economy benefits. Turbochargers typically include an intake air compressor rotationally coupled with an exhaust gas turbine, where the turbine provides thrust to the compressor by extracting energy from the exhaust flow.

The inventors herein have recognized a potential issue with turbocharged engines. Boosted engine operation at higher altitude regions may be sluggish. Specifically, the smaller turbocharged engines may lose power, particularly at low engine speeds such as engine idling speeds, due to the lower atmospheric air density. Air and corresponding power losses may also be incurred during transmission gear shifts. Further, the slower turbine response can lead to turbo lag and degraded boosted engine performance. In some engine systems, a wastegate coupled across the turbine can be used to increase engine air flow at idle to improve engine speed control. For example, the wastegate may be held closed to raise exhaust pressure upstream of the turbine. However, if the wastegate were used to increase engine air flow at idle conditions at the higher altitudes, the engine may demand to be operated with boost substantially all the time, including at idling conditions. As such, engine fuel economy may be reduced and noise, vibration, and harshness (NVH) may increase.

In view of the above, the inventors have recognized that electric compressor assist devices may be advantageously applied to assist in boosted engine idle speed control at higher altitudes. For example, a battery-driven electric motor coupled to the turbocharger compressor can be applied to provide sufficient boost to hold engine idling speeds without unnecessarily increasing engine speed to generate more torque. In one example, the above issue may be addressed by a method for a boosted engine comprising an electric motor powered by a battery bank to assist a compressor at higher altitudes.

As an example, an engine system may be configured with a turbocharger having a compressor driven by a turbine, the compressor further receiving, selectively, electric compressor assist (e.g., applying positive or negative torque to a turbocharger shaft or turbocharger components to accelerate or decelerate a compressor) from a battery-powered motor. In one example, the engine system may be coupled in a hybrid electric vehicle and the motor may be driven by a vehicle battery. During vehicle operation at higher altitude conditions, a ratio of assist provided to the compressor from the electric motor relative to assist provided to the turbine from an exhaust wastegate, may be varied based on a state of charge (SOC) of the vehicle battery to increase engine air intake pressure and improve engine idle speed control. For example, at higher battery SOC, more electric compressor assist may be provided while the wastegate may be left more open. In comparison, at lower battery SOC, less electric compressor assist may be provided while the wastegate may be left more closed. Further still, the electric motor may only be operated intermittently during engine idle speed control at higher altitudes, such as when required to raise engine speed to the idle speed, and may thereafter be deactivated. This allows the compressor assist to be advantageously used to maintain engine idling speeds at the higher altitude even before a tip-in event (e.g., increase in accelerator pedal position) occurs. Then, at the tip-in event, the electric compressor assist may be further increased as the boost demand increases to reduce turbo lag. The amount of electric motor assist provided to the compressor at higher altitudes may be similarly varied during a transmission gear shift to enable engine boost control during the gear shift. For example, less electric compressor assist may be provided during a transmission downshift at higher altitudes as compared to during a transmission upshift at higher altitudes. Compressor assist from the turbine provided via the wastegate may be correspondingly reduced. In each case, the amount of electric compressor assist provided may be adjusted (e.g., increased) as the altitude at which the vehicle is operating increases above a threshold to compensate for the corresponding drop in atmospheric air density.

In this way, boosted engine performance at higher altitudes can be improved without degrading fuel economy or raising NVH concerns. By increasing a ratio of electric compressor assist provided to a turbocharger compressor at higher altitudes, improved engine speed control may be achieved while an engine is idling and before a demand for boost pressure is received (e.g., such as due to a tip-in). Similarly, the electric compressor assist may be used to improve engine speed control during a transmission upshifting and downshift at the higher altitudes. By improving engine idling control, sluggish engine performance at higher altitudes may be averted. By coordinating wastegate adjustments with the electric compressor assist, usage of system battery charge during the providing of the electric compressor assist can be reduced, thereby improving overall hybrid vehicle performance.

The above discussion includes recognitions made by the inventors and not admitted to be generally known. Thus, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
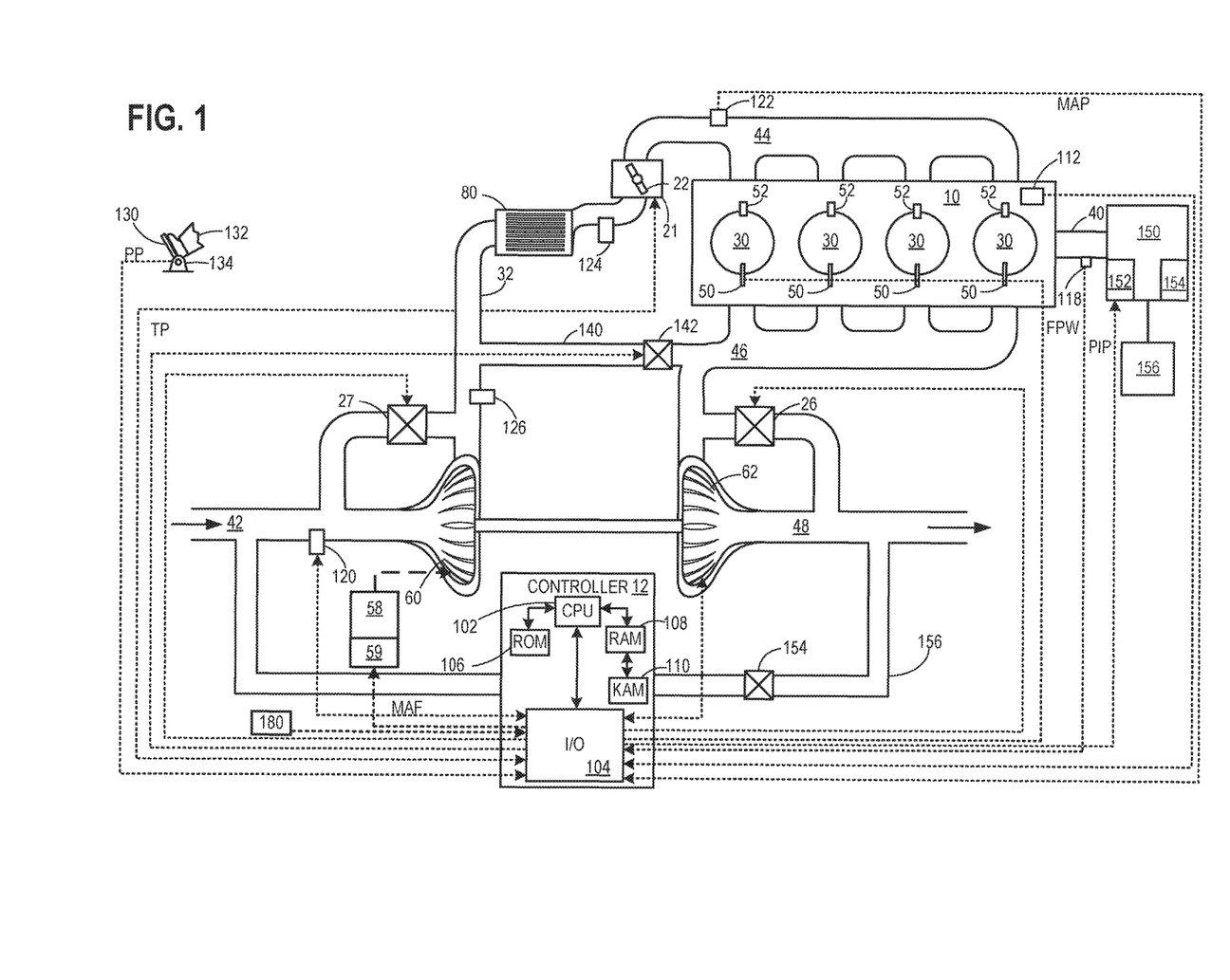
FIG. 1 shows a schematic diagram of a boosted engine with an electric motor coupled to a compressor.

The present description relates to improving idle speed control in a boosted engine, such as the engine system of FIG. 1, during engine operation at higher altitudes. In doing so, boosted engine performance may be improved. A hybrid vehicle controller may be configured to perform a control routine, such as the routine of FIG. 2, to apply electric compressor assist from an electric motor coupled to an intake compressor independently or in combination with compressor assist from an exhaust turbine wastegate. The compressor assist may be useful for maintaining an engine speed and torque during engine idling conditions and/or during a transmission gear shifting when the hybrid vehicle is operated at higher altitudes. By varying the ratio of electric compressor assist to wastegate based compressor assist provided based on altitude, sluggish engine performance at the higher altitudes due to low oxygen content of air may be reduced. An example use of electric compressor assist for engine idle speed control is shown at FIG. 3.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some examples, combustion chamber 30 may include two or more intake valves and/or two or more exhaust valves. Spark plugs 52 may protrude into combustion chambers 30 to provide an ignition source for combustion.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders.

Further, in the disclosed examples, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. The engine may additionally be provided EGR via low pressure EGR passage 156 and low pressure EGR valve 154. Low pressure EGR is routed from downstream of turbine 62 to upstream of a compressor 60.

Engine 10 may further include a compression device such as a turbocharger or supercharger including at least a compressor 60 arranged along intake passage 42 providing pressurized air to boost passage 32. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. As an example, compressor 60 may be at least partially driven by an electric motor 58. The electric motor 58 may be used independently or in conjunction with turbine 62 to operate compressor 60. Thus, the amount of compressed aircharge provided to one or more cylinders of the engine via a turbocharger or supercharger may be varied by controller 12, thereby varying the boosted engine output torque. The electric motor 58 may be powered by a battery bank 59.

In one example, the engine of FIG. 1 may be coupled in a hybrid vehicle and the electric motor may be a motor used for providing electric compressor assist. A state of charge of the battery bank may increase during braking, in which the electric motor may act as a generator and restore electric charge to the battery bank. Alternatively, the battery bank may be recharged by a separate generator powered by the engine, allowing the battery bank to be recharged during non-braking occasions.

Exhaust passage 48 may include wastegate 26 for diverting exhaust gas around turbine 62. Likewise, intake passage 42 may include a compressor recirculation valve (CRV) 27 configured to divert a portion of boosted intake air from downstream of the compressor to upstream of the compressor. Wastegate 26 and/or CRV 27 may be controlled by controller 12 based on boost pressure demand. For example, during a tip-out (e.g., decrease in accelerator pedal position) when a lower boost pressure is demanded, one or more of the CRV and wastegate may be opened. Likewise, wastegate 26 may be closed to increase exhaust pressure upstream of turbine, such as responsive to a tip-in, thereby expediting turbine spool-up and boost delivery via the compressor. In this way, boost pressure may be improved by increasing assist provided to the compressor via the exhaust turbine from adjusting the wastegate. Compressor assistance may be put into action decreasing an opening (or increasing a closing) of the wastegate to increase exhaust pressure upstream of the turbine. Thus, the compressor assist may reduce the delay in increasing a power output of the engine responsive to a throttle change, herein also referred to as turbo lag. As discussed above, the engine power delay may be due to the delay in exhaust pressure generation and turbine spool-up required to provide the demanded boost.

Electric motor 58 coupled to the compressor may also be operated to provide an electric compressor assist to the boosted engine compressor responsive to a tip-in. The electric compressor assist may be provided in addition to, or in place of, the compressor assist from the wastegate. For example, when a higher boost pressure is demanded (e.g., during a tip-in to wide-open-throttle (WOT)), each of electric compressor assist and compressor assist via the wastegate may be provided, thereby reducing turbo lag and improving boost response times. By introducing an electric component (e.g., electric motor 58) for providing electric compressor assist in combination with compressor assist from a wastegate, the compressor speed may be increased at a faster rate as compared to the compressor being solely powered by the turbine. Accordingly, turbo lag may be further reduced with the electric compressor assist and the engine may deliver the desired boost upon demand.

As discussed herein, electric compressor assist may also be applied during other conditions than a tip-in event during an engine idle or a transmission gear shift occurring at higher altitudes. Electric compressor assist during the engine idle or the gear shift may expedite run up of engine speed to a desired speed.

Crankshaft 40 may be coupled to at least one drive wheel of a vehicle via an intermediate transmission system 150. The transmission system 150 may include a multiple fixed gear automatic transmission having a plurality of discrete gear ratios, clutches, etc. In one example, the transmission may have only 8 discrete forward gears and 1 reverse gear. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have six available gears, where transmission gear six (transmission sixth gear) is the highest available gear and transmission gear one (transmission first gear) is the lowest available gear. In other examples, the vehicle may have more or less than six available gears.

As elaborated herein, a controller may vary the transmission gear (e.g., upshift or downshift the transmission gear) to adjust an amount of torque conveyed across the transmission and torque converter to vehicle wheels 156 (that is, an engine shaft output torque). The controller may initiate a transmission gear shift responsive to changes in the pedal position signal (PP) and vehicle speed. For example, as vehicle speed increases, the controller may upshift a transmission gear (e.g., from a transmission first gear to a transmission second gear). Alternatively, as PP decreases, the controller may downshift a transmission gear (e.g., from a transmission third gear to a transmission second or first gear). The transmission may be upshifted or downshifted by one or more transmission gears based on a difference between the initial gear ratio and the desired gear ratio. Further, the gear selection may be based on the final engine speed desired. For example, when the PP increases by a large amount, such as when the pedal is depressed fully to a wide open pedal (WOP) position, the controller may upshift the transmission by multiple gears in order to increase the amount of engine power that is transferred to the wheels.

As such, engine speed may vary based on the transmission gear selection. For example, during a transmission gear upshift, while the vehicle speed is held constant, the throttle opening is increased resulting in increased air mass flow to the engine, and a corresponding increase in engine speed. Likewise, during a transmission gear downshift, the throttle opening is reduced resulting in decreased air mass flow to the engine, and a corresponding decrease in engine speed. During upshift maneuvers electrical assist to the turbocharger helps keep the amount of boost under control through the transient period which exists from the start to the end of the gear shifting event. Because the higher gear will drive the engine speed down at the moment of transmission engagement without assist, the turbocharger speed will fall together with engine speed. This may result in loss of boost. The loss of boost may be at least partially avoided via the motor maintaining compressor speed during the shifting event to maintain boost pressure up and improve vehicle response at the end of the shift event. In the case of downshifts, the wastegate opens gradually to help keep the turbocharger speed under control.

In addition to controlling engine speed during a transmission shift, engine speed control may also be required during engine idling conditions to maintain an engine idle torque. As such, the engine idle speed is the rotational speed the engine runs at when the engine is uncoupled from the drivetrain and the accelerator pedal is not depressed, or when the vehicle is stopped with a transmission gear engaged and the accelerator pedal not depressed. At idle speed, the engine generates enough torque and power to smoothly operate engine ancillary components such as power steering, alternator, etc., and to propel the vehicle in first gear at less than a threshold speed. As an example, during engine idling conditions, engine control parameters and actuators may be adjusted to hold the engine speed at or around 700-900 rpm.

Maintenance of engine speed (herein also referred to as engine speed control) may be less effective when the vehicle engine is operated at higher than a threshold ambient altitude (e.g., above 2000 m). For example, when a hybrid vehicle with a boosted engine is operated at higher altitudes, both engine idle speed control and transmission shift engine speed control may be affected by a reduction in air density. Specifically, the engine speed may be lower than desired due to the lower air availability in the atmosphere at the higher altitude. As a result of this drop in air density, and the corresponding drop in engine speed from the desired speed, engine performance may decrease and engine operation may appear sluggish. The sluggish engine performance may affect vehicle drivability when the vehicle is operated in regions where the average altitude is higher.

At altitudes higher than a threshold ambient altitude, closing the wastegate 26 may not provide sufficient pressure upstream of the turbine during low engine loads (e.g., engine idle) due to the low oxygen content at high altitudes. As elaborated herein at FIGS. 2-3, engine speed control (during idling or transmission shifting) while operating at higher altitudes may be addressed via increased electric compressor assist from an electric motor coupled to an intake compressor of a boosted engine, and reduced compressor assist from the wastegate. Specifically, the electric motor may be selectively operated (e.g., intermittently operated) to raise engine intake pressure, thereby raising engine torque and speed to the desired idle speed (or transmission gear selection based speed). By increasing electric compressor assist from the electric motor, the compressor may be driven even during conditions when boost is not requested to improve aircharge delivery to the engine. As a result, the engine may receive sufficient charge air supply to maintain a desired engine speed control during engine idling or transmission gear shifting. By increasing the electric compressor assist, reliance on operation of a turbocharger of a boosted engine to maintain engine idling speed and torque may be reduced.

Specifically, a combination of compressor assist from the wastegate 26 and electric compressor assist from the electric motor 58 may be applied to drive the compressor 60 to provide sufficient charge to maintain engine speed during engine idling and transmission shifting at higher altitudes of engine operation. For operations including a combination of the wastegate and the electric motor, wastegate adjustments may be coordinated to both provide a desired amount of boost and reduce discharge of the battery bank's state of charge (SOC) (e.g., to below a threshold SOC). For example, electric compressor assist may be increased proportional to a decrease in wastegate compressor assist, and wastegate compressor assist may be increased proportional to a decrease in electric compressor assist. The wastegate compressor assist includes closing the wastegate to increase exhaust pressure upstream of the turbine. The operation of the wastegate and the electric motor may be adjusted based on an ambient altitude to mitigate a potential turbo lag. As mentioned above, maintaining an idle speed and/or torque may be difficult due to the decreased oxygen content. During such conditions, even before boost performance is requested, a ratio of the wastegate compressor assist and electric compressor assist at engine idle may be advantageously adjusted for a vehicle at a high ambient altitude to maintain an engine idle speed and/or torque for a boosted engine, such as by increasing electric compressor assist relative to wastegate compressor assist.

In some examples, the wastegate 26 may be completely closed to provide a maximum boost from turbine 60 during the engine idle. The difference between the desired boost and the maximum boost may be accommodated for by the electric compressor assist provided by the electric motor 58. In this way, the desired boost demand is met during the engine idle and electric current is used at a reduced rate, described in further detail below.

Methods for the operation of the compressor 60 via assistance from one or more of the wastegate 26 and the electric motor 58 will be discussed in further detail below. More specifically, the operation will be in regards to instances of low engine revolution ranges (e.g., idle or transmission gearshift) when a vehicle is at or above a threshold vehicle altitude (e.g., 2000 m).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted air mass flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 118, which is also used as an engine speed sensor, may produce a predetermined number of equally spaced pulses every revolution of the crankshaft 40.

Controller 12 may further receive information regarding the location of the vehicle from an on-board global positioning system (GPS) 180. Information received from the GPS 180 may include vehicle speed, vehicle altitude, vehicle position, etc. This information may be used to infer engine operating parameters, such as local barometric pressure. Controller 12 may further be configured to receive information via the internet or other communication networks. Information received from the GPS 180 may be cross-referenced to information available via the internet to determine local weather conditions, local vehicle regulations, local traffic conditions, etc. Controller 12 may use the internet to obtain updated software modules which may be stored in non-transitory memory therein. Additionally or alternatively, sensor 180 may be a barometric sensor.

Other sensors that may send signals to controller 12 include a temperature sensor 124 at an outlet of a charge air cooler 80, and a boost pressure sensor 126. Other sensors not depicted may also be present, such as a sensor for determining the intake air velocity at the inlet of the charge air cooler, and other sensors.

Figure 2:
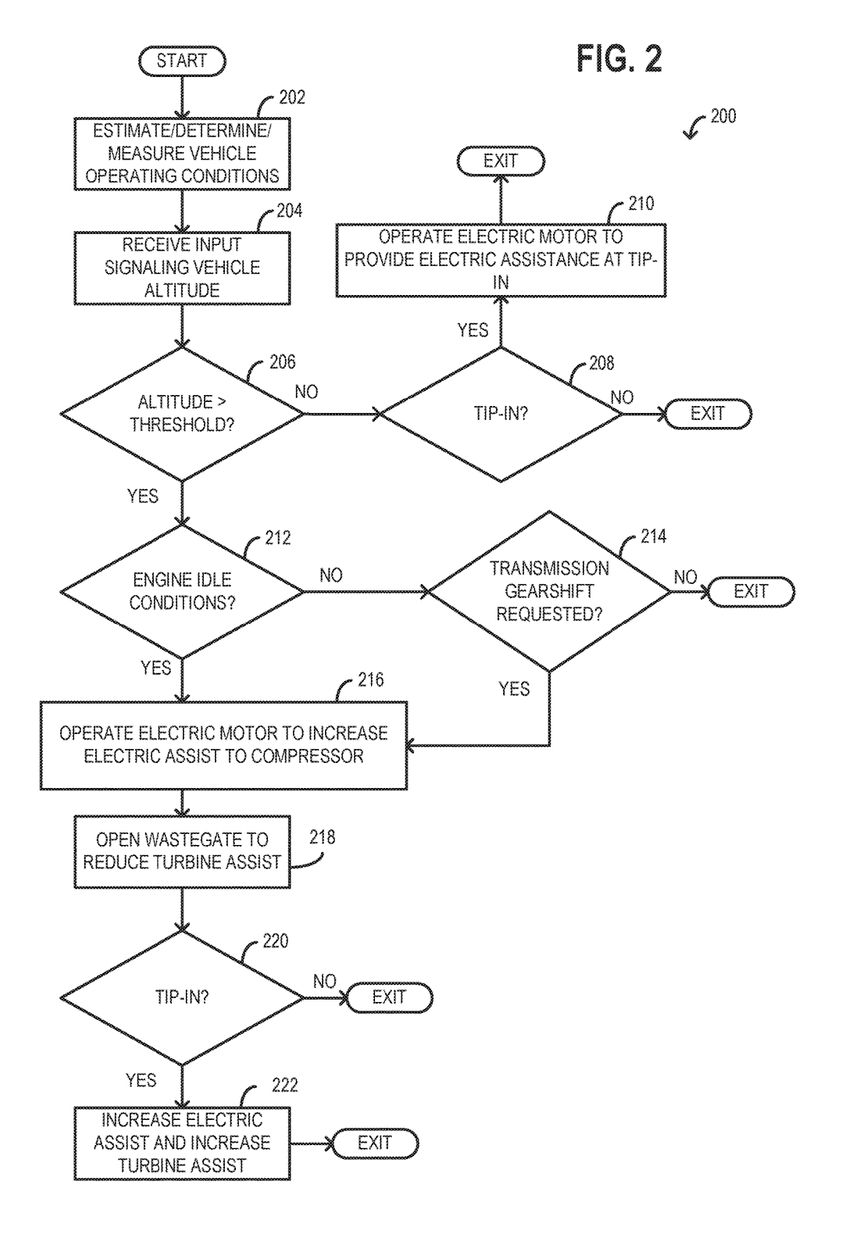
FIG. 2 shows a flow chart demonstrating an exemplary method for selectively operating the electric motor of FIG. 1 to vary the amount of electric compressor assist provided to the compressor at different operating conditions.
Figure 3:
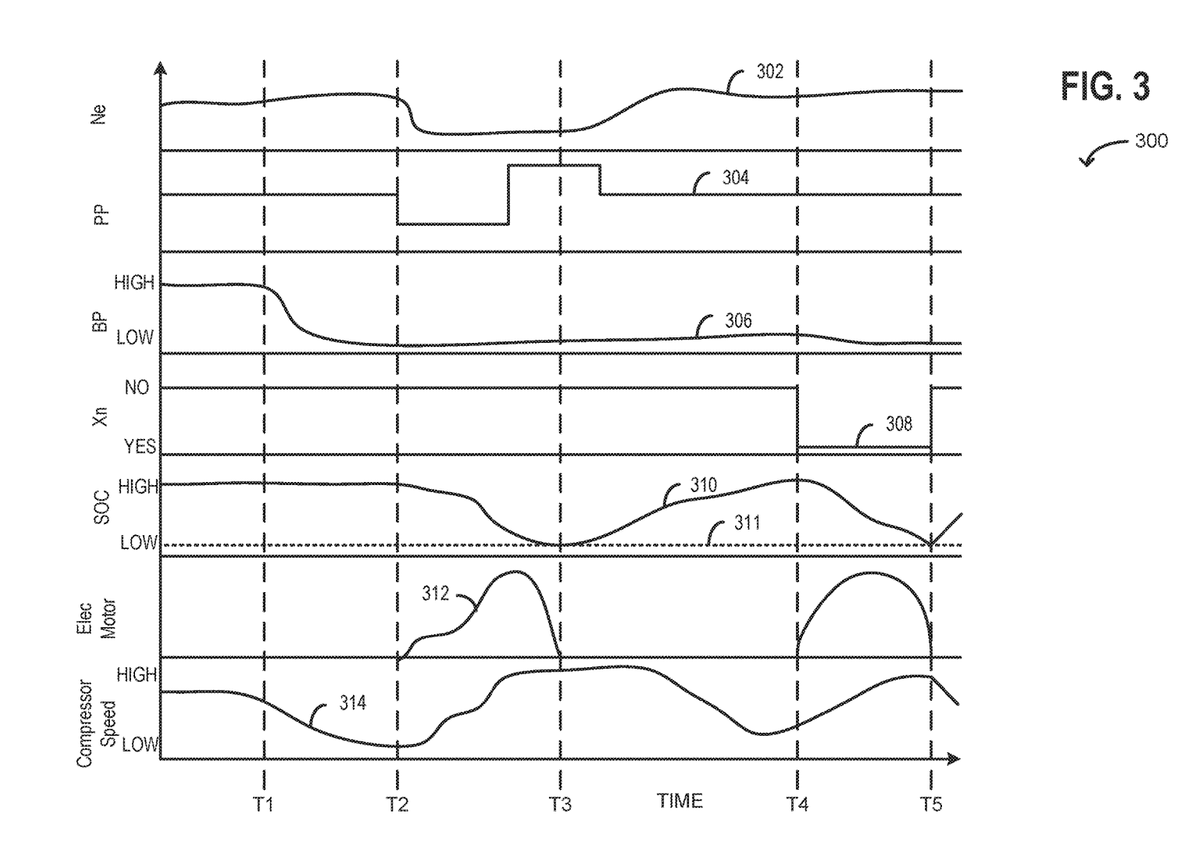
FIG. 3 shows a plot illustrating use of electric compressor assist from the electric motor for engine idle speed control at higher altitude vehicle operation.

FIG. 2 shows an exemplary method 200 for determining a vehicle altitude and adjusting a ratio of turbocharger compressor assist provided from an electric motor relative to a turbocharger compressor assist provided from an exhaust wastegate based on the vehicle altitude during engine idling conditions. Adjusting the ratio may further include adjusting the ratio based on a transmission gear shift and an operator pedal tip-in. The method 200 may begin at 202 by estimating, determining, and/or measuring current vehicle operating conditions. The vehicle operating conditions may include but are not limited to a battery state of charge (SOC), vehicle speed, vehicle altitude, engine speed, accelerator pedal position, and/or throttle position.

At 204, the method 200 includes receiving an input signaling a vehicle altitude. The input signal may be received from either an ambient barometric pressure sensor or a navigational system coupled to the GPS. The barometer measures an atmospheric pressure, herein the atmospheric pressure will be referred to as a barometric pressure. As the vehicle altitude increases, the barometric pressure decreases due to a reduced ambient air pressure (e.g., density of air decreases due to gravity causing a reduced barometric pressure). Additionally or alternatively, the vehicle altitude may be determined via a navigation/GPS system. The GPS system may determine if a vehicle altitude is greater than or equal to a threshold vehicle altitude (e.g., 2000 m). Further, the GPS system may be able to predict if a vehicle altitude will be greater than or equal to the threshold vehicle altitude based on a driver input. The driver input may signify a route a driver plans to follow with guidance from the GPS system. Based on the route, the GPS system may be able to predict instances of the vehicle altitude being greater than or equal to the threshold vehicle altitude.

At 206, the method 200 includes determining if the vehicle altitude is greater than the threshold vehicle altitude. The determining may include comparing one or more of a signal received from the barometer and the GPS system. If the vehicle altitude is less than the threshold vehicle altitude, then the method proceeds to 208 monitor a tip-in. If a tip-in occurs, then the method 200 proceeds to 210 operate the electric motor to provide electric compressor assist at the tip-in. The output and speed of the electric motor may be increased as the boost demand at the tip-in increases. This may be due to insufficient boost at vehicle tip-in caused by a delay in turbine spool-up. Alternatively, the low boost may be due to a lack of backpressure upstream of a turbine, such as due to a wastegate being stuck open, a degraded fuel injector, and a degraded spark plug. The method may then exit. In addition to providing electric compressor assist at the tip-in, turbine assist may also be provided, such as by reducing an opening of the wastegate.

If a tip-in is not occurring, then the method may not demand electric compressor assist and the electric motor is not operated. The method may then exit.

Returning to 206, if the vehicle altitude is greater than the threshold vehicle altitude, then the method 200 proceeds to 212 to monitor engine idle conditions. The engine idle conditions may include a vehicle speed being less than a threshold vehicle speed and an accelerator pedal not being fully depressed/actuated. If idle conditions are not met, then the method 200 proceeds to 214 to confirm if a transmission gearshift was requested or completed. Completion of the transmission gearshift may be confirmed based on monitoring of a ratio of wheel speed to engine speed, throttle position, and/or vehicle speed. A gear shift request may be confirmed via a state of a gear shift request variable. If a gearshift is not confirmed, electric compressor assist may not be required for engine speed control and the method 200 may exit.

When the vehicle altitude is greater than or equal to the threshold vehicle altitude (e.g., high altitude), engine performance may be sluggish due to the lower oxygen content of the intake aircharge being delivered to the engine cylinders. As a result, the final engine speed reached may be lower than the target engine speed, such as a desired engine idling speed If idle conditions are met or a transmission gearshift is confirmed, then the method 200 proceeds to 216 to operate an electric motor (e.g., electric motor 58) coupled to the compressor to increase a proportion of electric compressor assist delivered to the engine at the higher altitude condition. The electric compressor assist provided from the electric motor includes spinning the compressor via the electric motor powered by a battery bank to increase aircharge delivered to the engine. The vehicle engine controller (e.g., controller 12) may send a signal to activate the electric motor in response to the engine entering idle conditions or initiating (or completing) a transmission gearshift while at the higher than threshold altitude. The electric motor may receive an electric charge from a battery bank.

Specifically, the electric motor may be used to provide electric compressor assist at engine idling before a tip-in event is confirmed. Alternatively, the assist is provided after a transmission gear shift is completed. During idling, electric compressor assist from the motor may be used to maintain the engine idle speed. A ratio of electric compressor assist provided from the electric motor relative to the compressor assist provided from the exhaust wastegate is thus adjusted based on the altitude. As the ambient altitude increases beyond a threshold altitude, the amount of electric compressor assist may be increased while the amount of wastegate based compressor assist is correspondingly decreased. Specifically, the output of the electric motor may be increased based on the engine speed relative to the idle speed while the opening of the wastegate is increased as the electric compressor assist is increased.

During a transmission gear shift, the amount of electric compressor assist provided to the compressor from the electric motor may be based on the ambient altitude and the transmission gear shift. As a difference between the ambient altitude and the threshold ambient altitude increases (e.g., vehicle gains elevation), the electric compressor assist provided may increase while the turbine assist is decreased. Specifically, wastegate opening may be increased. Additionally or alternatively, electric compressor assist from the electric motor may be increased as the transmission is shifted through a larger number of transmission gears (e.g., more assist when transitioning from third gear to first gear as compared to when transitioning from second gear to first gear). Further still, the electric compressor assist may be based on the gear at which the shift was requested. For example, more assist may be demanded when shifting from the third gear to the fourth gear as compared to when shifting from the second gear to the first gear. In some examples, the amount of electric compressor assist provided may be greater for a transmission gear downshift than a transmission gear upshift to create exhaust brake assistance. In this case, the electric motor can slow the turbine down to increase exhaust gas backpressure which may drive engine pumping losses up and decrease a turbine speed.

In some examples, additionally or alternatively, when a turbocharger operates at high altitudes, the lower ambient pressure may cause a pressure differential across the turbine component to exceed a desirable operating threshold. This may cause turbine speed to exceed a threshold turbine speed, which may translate into an overboost or overpressure condition in the compressor and ultimately degrade the engine. To hinder degradation from occurring, the electric motor can be used to measure the turbocharger shaft speed. If this measurement exceeds a preset threshold at an altitude greater than the threshold altitude, the motor itself can be employed as a brake to restrain the shaft and protect the device from exceeding its desirable operational limits. This can also be used to brake the turbo when doing downshifts such as mentioned previously, for instance when shifting from fifth to third gear. Furthermore, by being able to continually acquire the turbocharger's speed by using the electric motor instead of the common sensors normally used, the combustion engine control system can more accurately and reliably decide when to operate the wastegate in order to control turbine inlet pressure and gas flows.

In some examples, additionally or alternatively, conditions for the electric motor to provide electric compressor assist may further include a clutch being depressed, an accelerator pedal being less depressed, and a torque demand decreasing (e.g., a transmission shift). During these conditions, a vehicle may naturally decrease a compressor speed due to a decreased torque demand. However, in order to allow the vehicle to upshift with a demanded amount of boost, it may be preferred to maintain the compressor speed with the electric compressor assist during the decreased torque demand. In this way, the compressor may quickly provide boost upon a subsequent upshift if demanded.

The method 200 then proceeds to 218 to adjust the wastegate to reduce the compressor assist based on the determined increase in electric compressor assist. Specifically, the wastegate opening is increased as the electric compressor assist provided increases. Adjusting the wastegate may include opening the wastegate to decrease a compressor assist in response to an increasing electric compressor assist provided from the electric motor while a vehicle altitude is at or above the threshold vehicle altitude. Moving towards a fully open wastegate may further include determining a turbine speed, in which the opening is based on a combination of a turbine speed and compressor speed meeting a boost demand. In this way, the controller may adjust a ratio of compressor assist provided from the electric motor relative to compressor assist provided from the wastegate.

The ratio may be further adjusted based on the SOC of the battery bank. In particular, the electric compressor assist provided from the electric motor may be increased as a difference between the SOC of the battery bank and a threshold SOC increases. Thus, during a first engine idle control at a given higher altitude performed while the battery bank is at a first SOC further from the threshold SOC, electric compressor assist and compressor assist provided via the wastegate may be provided at a first ratio. In comparison, during a second engine idle control at the given higher altitude performed while the battery bank is at a second SOC closer to the threshold SOC, electric compressor assist and compressor assist provided via the wastegate may be provided at a second ratio wherein the second ratio has a higher proportion of compressor assist via the wastegate and a lower proportion of electric compressor assist as compared to the first ratio. Thus, as the SOC of the battery bank starts to fall, engine idle control at higher altitudes may start transitioning to lower reliance on electric compressor assist and higher reliance on compressor assist via the wastegate. Accordingly, a desired engine speed may be obtained via a combination of the electric compressor assist provided by the electric motor and the compressor assist provided by the wastegate.

The method 200 then proceeds to 220 to monitor a tip-in. If the tip-in does not occur, the method 200 continues to selectively (and intermittently) provide assistance via the electric motor and/or turbine wastegate to maintain the engine speed control. The method may then exit.

If the tip-in does occur, the method 200 proceeds to 220 to further adjust the ratio of electric compressor assist to turbine based on the tip-in torque (or boost) demand. The tip-in demand may be determined based on one or more of a pedal position and a throttle position. The pedal may become more depressed and/or the throttle position may become more open as the demand at tip-in increases. As the tip-in torque or boost demand increases, the electric compressor assist provided by the electric motor may be further increases, provided the battery bank has sufficient SOC. In addition, the wastegate assist may also be increased. Specifically, the controller may increase each of electric compressor assist and turbine assist to as the tip-in demand increases. The method may then exit.

In this way, during a first condition, while an engine is idling when at a higher than threshold altitude, engine speed control is achieved by increasing an electric compressor assist provided from an electric motor to a compressor while decreasing compressor assist provided from an exhaust wastegate. In comparison, during a second condition, responsive to a tip-in while the engine is at the higher than threshold altitude, increasing the electric compressor assist and increasing the compressor assist via the wastegate.

Method 200 thus provides a routine for determining a vehicle altitude and providing an electric compressor assist at higher than threshold altitudes. The method may include adjusting a ratio of turbocharger compressor assist provided from an electric motor relative to a turbocharger compressor assist provided from an exhaust wastegate based on an ambient altitude. The electric compressor assist may be in response to an engine idle control speed and/or a transmission gearshift request. The ratio may be further adjusted based on a state of charge of a battery bank coupled to the electric motor. Furthermore, the electric compressor assist and the turbine assist may be provided at vehicle altitudes below the threshold vehicle altitude responsive to a vehicle tip-in.

FIG. 3 illustrates plot 300 of various engine conditions affecting compressor speed and electric motor operation for a vehicle above the threshold vehicle altitude. It should be understood that the examples presented in FIG. 3 are illustrative in nature, and other outcomes are possible. For example, additional or alternative engine parameters may affect the electric motor (e.g., wastegate).

The graphs in FIG. 3 represent various operating parameters and resultant engine controls for operating an electric motor. The horizontal axes represent time and the vertical axes represent the respective engine condition being demonstrated. On plot 300, graph 302 represents an engine speed, graph 304 represents an accelerator pedal position (PP), graph 306 represents a barometric pressure, graph 308 represents a transmission gear shift, graph 310 represents a state of charge (SOC) of a battery bank and graph 311 represents a threshold SOC, graph 312 represents an electric motor electric compressor assist to a compressor, and graph 314 represents a compressor speed.

Plot 300 will be described herein with reference to components and systems depicted in FIG. 1, particularly, electric motor 58, battery bank 59, compressor 60, turbine 62, wastegate 26, accelerator pedal 130, and engine 10. Plot 300 may be measured by a controller (e.g., controller 12) according to computer-readable media stored thereon.

Prior to T1, the engine speed and pedal position are relatively constant, as shown by graphs 302 and 304 respectively. The barometric pressure is relatively high (e.g., vehicle at an ambient altitude below the threshold vehicle altitude) as shown by graph 306. The compressor speed is relatively high, shown by graph 314. For a vehicle below the threshold vehicle altitude, a wastegate may be able to provide sufficient backpressure upstream of the turbine to power the compressor and meet a boost demand. The transmission gear is fixed (e.g., first gear), represented by graph 308. The SOC is greater than a threshold SOC, shown by graph 310 and line 311 respectively. Furthermore, the electric motor is disabled, as shown by graph 312.

At T1, the barometric pressure begins to decrease as the vehicle altitude increases beyond the threshold vehicle altitude. This may be due to a decrease in air pressure as ambient altitude increases. As a result, the compressor speed also begins to decrease as the exhaust backpressure created by the wastegate may no longer be able to spin the turbine fast enough to provide the demanded turbine assist to the compressor. The electric motor remains disabled due to a boost demand being satisfied. After T1 and prior to T2, the barometric pressure and the compressor speed continue to decrease to relatively low values. The electric motor remains disabled. The engine speed, pedal position, and transmission gear remain relatively constant. The SOC remains above the threshold SOC.

At T2, the pedal position decreases (e.g., pedal is released) and as a result, the engine speed begins to decrease and begins to enter engine idle. The barometric pressure remains relatively low (e.g., vehicle/ambient altitude is at or above the threshold vehicle altitude). The compressor speed remains relatively low due to the low barometric pressure. The electric motor is initiated to maintain an engine idle control speed. Consequently, the SOC begins to decrease but remains above the threshold SOC. The transmission gear remains constant (e.g., first gear). After T2 and prior to T3, the electric compressor assist received by the compressor from the electric motor increases and as a result, the compressor speed begins to increase to a relatively high level. The SOC of the battery bank begins to decrease as the battery bank transfers electrical energy to the electric motor. The pedal position increases in response to a tip-in out of idle. Accordingly, the electric motor electric compressor assist increases and the SOC begins to decrease more rapidly compared to during the engine idle. In other words, as the boost demand increases (e.g., from idle to tip-in) the electric compressor assist received by the compressor from the electric motor increases and the SOC decreases at an increased rate when compared to the engine idle electric compressor assist. Increasing the amount of electric compressor assist during the tip-in may include further increasing ratio of electric compressor assist to compressor assist provided to the turbocharger via the wastegate responsive to the tip-in relative to the idle speed control. For example the wastegate may be held less open responsive to the tip-in as compared to during idle control. Therefore, as a rate of electric compressor assist increases, the rate of drop in SOC increases. The barometric pressure continues to remain low.

In some examples, the turbine may still be able to partially drive the compressor, even at ambient altitudes at or above the threshold vehicle altitude. In such an example, the electric motor may be used based on a difference between a boost demand and the compressor assist via the wastegate. As the difference increases, the electric compressor assist increases so long as there is a sufficient SOC. In other words, the electric motor may be used separately or congruently with the turbine to drive the compressor.

At T3, the electric motor is disabled and the compressor speed remains relatively high. The compressor may remain relatively high due to the engine speed no longer being low. Accordingly, the engine may produce enough exhaust with the wastegate closed or partially closed to drive the turbine to provide a compressor assist to power the compressor to provide the desired boost. The transmission gear remains constant and the barometric pressure remains relatively low. The SOC begins to recharge, which may be attributed to a generator being driven by the engine motor. The compressor speed remains high due to residual power delivered to the compressor via the electric motor. After T3 and prior to T4, the compressor speed begins to decrease due to the electric motor being disabled and the backpressure being low. The SOC continues to increase. The transmission gear remains constant. The PP begins to decrease. As the PP stops decreasing, it remains at a constant rate. The engine speed continues to increase until it reaches a relatively high value and remains constant.

At T4, the transmission gear is upshifting and as a result, electric motor activation is initiated. During an upshifting operation, the engine speed decreases after transmission reengagement producing a decrease in the turbocharger compressor speed, which reduces the power output driving the car. To compensate a delay of power loss at high altitudes, the electrical motor is engaged to maintain the turbocharger compressor speed and maintain the operation of the turbocharger until the next gear is engaged. This also avoids the engine from choking at high altitude locations when shifting up. Accordingly, the SOC begins to decrease and the compressor speed begins to increase as the electric motor is activated. The barometric pressure remains low (e.g., vehicle altitude is at or above the threshold vehicle altitude). Pedal position and engine speed remain relatively constant. After T4 and prior to T5, the electric compressor assist provided by the electric motor increases and therefore the compressor speed continues to increase. The electric compressor assist provided may help reduce a potential turbolag. The SOC continues to decrease toward the threshold SOC. The transmission gear is still upshifting. The engine speed and pedal position are relatively constant. The barometric pressure remains low.

At T5, the SOC reaches the threshold SOC, therefore, the electric motor is deactivated. Accordingly, the compressor speed begins to decrease. The transmission gear is no longer upshifting. The pedal position and engine speed remain relatively constant. After T5, the compressor speed continues to decrease. The electric motor remains deactivated. The SOC begins to increase as the generator powered by the engine recharges the battery bank. The pedal position and engine speed remain relatively constant. The transmission gear is unchanged.

In some examples, the electric motor may continue to provide electric compressor assistance to the compressor if after the transmission gear shift the engine enters idle. Transitioning from the transmission gear shift to the engine idle may include a decrease in electric compressor assist provided by the electric motor. Additionally or alternatively, the electric compressor assist provided by the electric motor may decrease and the turbine assist provided by the turbine may increase upon the transmission gear shift completing and the engine does not enter idle.

In further representations, engine idle speed control during vehicle operation at higher altitudes may be achieved by varying one of electric compressor assist and turbine assist while maintaining the other assist at a fixed level. For example, during a first condition, when a hybrid vehicle with a boosted engine is operated at a first, lower, altitude, and at a given engine speed/load, the engine may be operating with a first wastegate position and a first total level of compressor motor torque assist. In comparison, during a second condition, when the vehicle is operated at a second, higher, altitude, for the (same) given engine speed/load, the engine may be operated with a second wastegate position and a second total level of compressor motor torque assist. The second wastegate position may be adjusted to be more closed than the first wastegate position. Further, the second total level of compressor motor torque may be adjusted to be higher than the first level.

Figure 4:
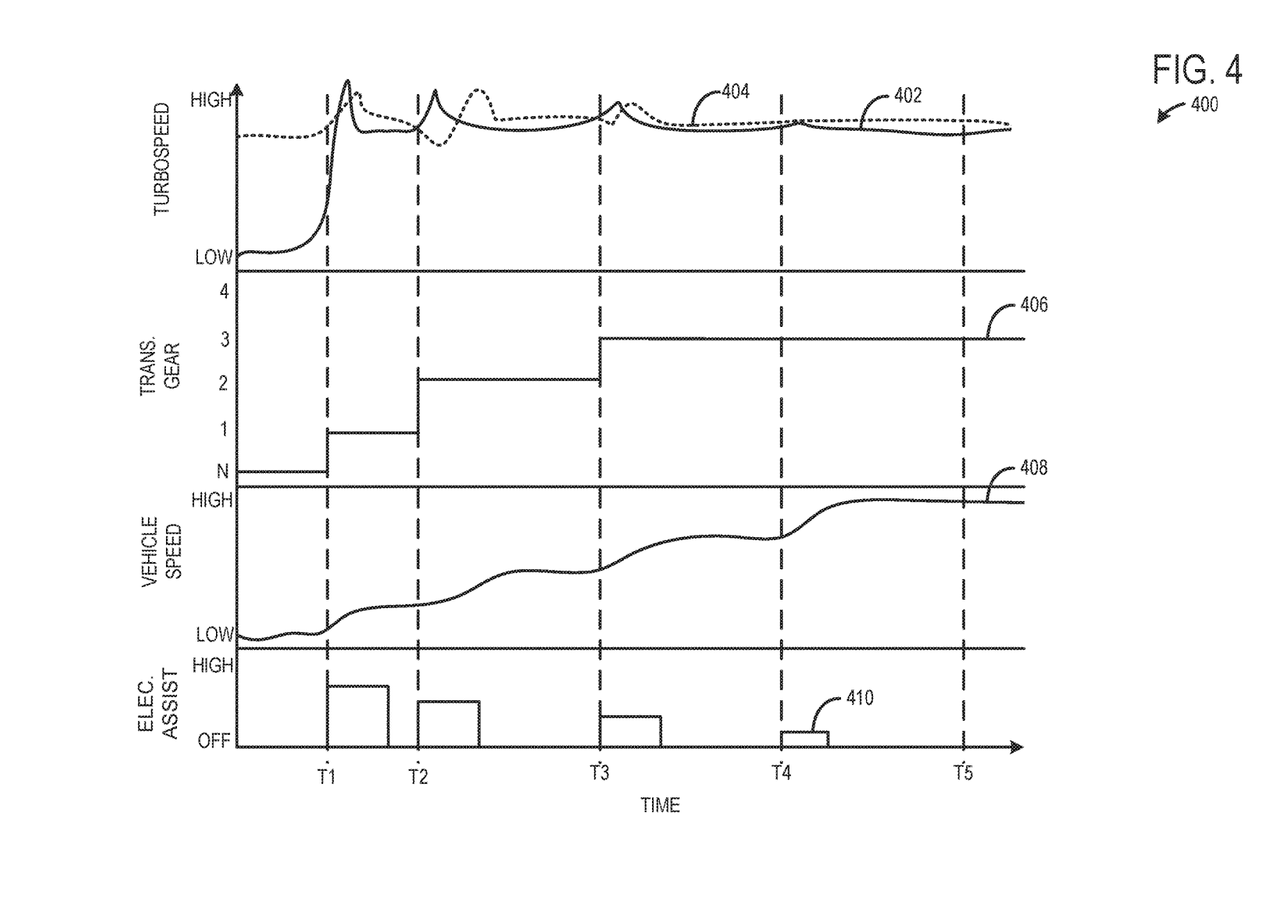
FIG. 4 shows a plot illustrating vehicle acceleration and a compressor speed of both a compressor with no electric compressor assist provided and a compressor with electric compressor assist provided.

FIG. 4 illustrates plot 400 comparing compressor speeds of a compressor without electric compressor assist and a compressor with electric compressor assist as a vehicle speed increases for vehicles at an altitude greater than a threshold altitude when the two compressors are operated at similar conditions. It should be understood that the examples presented in FIG. 4 are illustrative in nature, and other outcomes are possible.

The graphs in FIG. 4 represent various operating parameters and resultant engine controls for maintaining a compressor speed. The horizontal axes represent time and the vertical axes represent the respective engine condition being demonstrated. On plot 400, graph 402 represents a first turbocharger compressor speed of a compressor coupled to an electric motor in a first vehicle, graph 404 represents a second turbocharger compressor speed of a compressor that is not coupled to an electric motor in a second vehicle, graph 406 represents a transmission gear position, graph 408 represents a vehicle speed, and graph 410 represents an electric compressor assist. Plot 400 will be described herein with reference to components and systems depicted in FIG. 1, particularly, electric motor 58, battery bank 59, compressor 60, turbine 62, wastegate 26, accelerator pedal 130, and engine 10. Plot 400 may be measured by a controller (e.g., controller 12) according to computer-readable media stored thereon.

Prior to T1, the vehicle speed is low and the transmission gear is in neutral, as shown by graphs 408 and 406 respectively. Therefore, an engine boost demand may be low due to no torque change. The electric compressor assist is disabled, as seen by graph 410. The compressor speed of the first compressor coupled to the electric motor is relatively low, as shown by graph 402. The second compressor speed of the compressor not coupled to an electric motor is relatively high, as shown by graph 404. The first compressor speed may be relatively low due to the electric motor being able to provide an electric compressor assist upon an increased boost demand. The second compressor speed may be relatively high due to the difficulties mentioned above (e.g., low oxygen content of air at high altitudes makes it difficult to increase a compressor speed) in order to meet a boost demand and reduce a turbolag. By maintaining the second compressor at a relatively high compressor speed, the difficulties may be circumvented and the second compressor may provide a demanded boost. However, by doing this, the second compressor may also provide excess boost during engine operation, as is the case under the current engine conditions. Additionally, by maintaining the second compressor speed at a relatively high speed, a fuel economy is decreased due to excess power being provided to the second compressor. The second compressor's higher speed may be provided via closing a wastegate of the second turbocharger.

At T1, a tip-in occurs and the vehicle speed begins to increase. The transmission gear begins to shift from neutral to first gear in order to accelerate the vehicle based on a torque demand corresponding to the tip-in. The electric motor is initiated and it provides a relatively high electric compressor assist to the first compressor so that the first compressor speed may increase in order to provide a boost demand corresponding to the increased torque demand. An amount of electric compressor assist provided to the first compressor may vary based on the transmission gear shift. For example, an amount of electric compressor assist provided for a gearshift from neutral to first gear may be greater than an amount of electric compressor assist provided for a gearshift from first gear to second gear. Additionally or alternatively, the amount of electric compressor assist provided may be based on a difference between a compressor speed corresponding to a boost demand and a current compressor speed, in which as the difference increases, the electric compressor assist also increases. The second compressor speed also begins to increase, although without the assistance of an electric motor, in order to provide the demanded boost. Comparatively, the second compressor speed increases at a lower rate than a rate of speed increase for the first compressor, which may be due to electric compressor assist being sent to the first compressor. The second compressor speed may increase at a lower rate also because of high altitude conditions causing a reduced engine output, as described above.

After T1 and prior to T2, the first and second compressor speeds continue to increase until both meet the boost demand. The boost demand may be based on one or more of a tip-in and a gearshift. For example, the boost demand for a gearshift from first gear to second gear may be greater than a boost demand for a gearshift from third gear to further gear. Additionally or alternatively, the boost demand for a gearshift may be greater than a boost demand for a tip-in outside of a gearshift (e.g., when a gear is fully engaged). The boost demand may increase as an amount of tip-in increases (e.g., pedal is more depressed). Upon meeting the boost demand, both compressor speeds begin to decrease to a lesser compressor speed. However, the second compressor remains at a higher compressor speed than the first compressor due to an anticipated drop in compressor speed at T2, as will be described below. The second compressor speed may decrease at T2 due to a reduced torque demand during a gear shift. As depicted, the first compressor speed increases at a higher rate than the second compressor speed due to the electric compressor assist. The electric compressor assist is terminated upon the first compressor reaching a relatively constant compressor speed corresponding to a torque demand of the engine during nominal vehicle operation (e.g., no tip-in and/or gearshift). After a threshold time following the transmission gearshift, the first compressor speed may decrease and reach the relatively constant compressor speed. The threshold time may vary depending on the transmission gear (e.g., a threshold time for a first gear may be greater than a threshold time for a second gear. The second compressor provides the demanded boost at a later time than the first compressor (e.g., a turbolag), which may result in sluggish vehicle performance (e.g., reduced drivability). The transmission gear remains in first gear and the vehicle speed begins to increase at a slower rate.

At T2, the vehicle speed begins to increase and the resulting torque demand is outside the torque range of the first gear. As a result, the transmission gear shifts from first gear to second gear. As the vehicle upshifts, the engine becomes disengaged from the wheels, and during the disengagement, a torque demand decreases to nearly zero. The decreased torque demand reduces the compressor speed of second compressor, which results in the second compressor providing the boost demand after a lag time. The electric compressor assist is activated in response to the decreased torque demand along with one or more of a clutch being depressed and a pedal being less depressed in order to maintain the first compressor speed such that the boost demand is met with minimal to zero turbolag. In this way, drivability may not be reduced with respect to the first compressor. The torque demand increases once the engine and transmission reengage.

After T2 and prior to T3, the vehicle speed continues to increase. The transmission gear remains in second gear. The first compressor speed quickly increases to meet the boost demand corresponding to the increased torque demand (not shown). The first compressor reaches the boost demand more quickly than the second compressor due to the electric compressor assist provided by the electric motor and a speed decrease experienced by the second compressor due to the disengagement (e.g., torque demand reduction) described above. The electric compressor assist for the first compressor remains active until the threshold time (e.g., time taken to reach a boost demand corresponding to nominal engine operation in the second gear) is reached. Furthermore, an amount of electric compressor assist provided to the first compressor for the gear shift from first gear to second gear may be less than the amount of electric compressor assist provided during the gear shift from neutral to first gear, as described above. In some examples, the electric compressor assist may be substantially equal (e.g., a 5% increase of the engine air amount after the gear shift completes) for all gear shifts.

The compressor speed of the second compressor decreases prior to reengaging the engine and the transmission in the second gear. Upon reengagement, the compressor speed of the second compressor begins to increase to meet a boost demand. A second compressor speed increases at a slower rate than the first compressor due to one or more of not receiving electric compressor assist and a lower oxygen concentration at high altitude resulting in a decreased engine output. As a result, the second compressor provides the boost demand after a delay (e.g., turbolag), resulting in more sluggish vehicle performance. The compressor speed of the first compressor decreases. However, the compressor speed of the second compressor remains higher than the first compressor due to anticipation of a compressor speed decrease upon a subsequent upshift, as described above. In this way, fuel economy decreases due to excess power demanded by the second compressor in order to maintain a compressor speed.

At T3, the vehicle speed increases. The transmission gear shifts from second gear to third gear. The electric compressor assist is activated to increase the first compressor speed in order to meet the boost demand corresponding to the upshift from second gear to third gear. The electric compressor assist for the upshift from the second gear to the third gear may be less than the electric compressor assist provided for the upshift from the first gear to the second gear. This may be due to the compressor speed of the first compressor already being high during the upshift from second gear to third gear, resulting in a decreased demand for electric compressor assist.

Additionally, after the off-going clutch (e.g., previous gear clutch) begins to release and before the on-coming clutch (e.g., new gear clutch) is fully engaged, the torque demand decreases, as described above. The first compressor speed does not decrease due to the electric compressor assist maintaining the compressor speed of the first compressor despite the decrease in torque demand. The second compressor speed decreases responsive to the decreased torque demand and decreased exhaust flow. However, due to maintenance of a relatively high compressor speed of the second compressor prior to the upshift, the second compressor may meet a boost demand more quickly (e.g., decreased turbolag) than compared to the turbolag during the first gear to second gear upshift mentioned above.

After T3 and prior to T4, the vehicle speed continues to increase. The transmission gear remains in third gear. The electric compressor assist provided to the first compressor is terminated after the threshold time is reached. In some examples, the threshold time may vary for each upshift, in which the threshold time decreases as the vehicle speed increases. In some examples, additionally or alternatively, the threshold time may be substantially equal for each upshift. Further, in some examples, the electric compressor assist timing may be provided until a threshold amount of air flows through the engine and into the exhaust so that boost via the turbine may be ensured.

The first compressor speed increases rapidly due to the electric compressor assist provided by the electric motor. The first compressor is able to meet a boost demand relatively quickly with minimal to no turbolag. The first compressor speed decreases after meeting the boost demand and reaches a relatively constant compressor speed after the threshold time has passed.

The second compressor speed decreases prior to the on-coming clutch being fully engaged while the off-going clutch is being released due to the decreased torque demand to provide a smooth gear shift. The second compressor provides the boost demand with a reduced turbolag compared to the turbolag during the gearshift from first gear to second gear. This may be due to the second compressor speed being maintained at a relatively high compressor speed and the boost demand being less than the boost demand for the gearshift from first gear to second gear. As depicted, the turbolag is decreased; however, the second compressor is still unable to meet the boost demand as quickly as the first compressor, due to reasons stated above. The second compressor speed decreases, but it does not decrease to a speed as low as the first compressor speed in order to maintain the second compressor speed for future engine torque demand increases at the expense of reduced fuel economy.

At T4, the vehicle speed increases due to a tip-in and the transmission gear remains in third gear. During this example, an engine torque range while the transmission is in third gear is determined to be able to provide the demanded torque increase to the wheels of the vehicle without a gearshift. The increasing torque demand results in an increased boost demand; however, the boost demand for the second compressor may be met without providing compressor assist because the exhaust mass flow rate is already at a higher level and the wastegate is partially closed to provide more rapid torque response. On the other hand, since electric compressor assist is low for the first compressor before the tip-in and since wastegate assist is reduced for the first compressor, electric compressor assist is initiated and provided to the first compressor so that its speed may increase.

After T4 and prior to T5, the electric compressor assist continues until a tip-in threshold time has passed. The threshold time for a tip-in may be less than the threshold time for a gear shift, which may be due to a comparatively smaller boost demand for the tip-in. The electric compressor assist is disabled upon reaching the tip-in threshold time or threshold engine mass flow rate. The first compressor receives the electric compressor assist and the compressor speed of the first compressor increases in order to meet the boost demand. The first compressor speed begins to decrease following meeting the boost demand.

As depicted, the second compressor speed is relatively high and may not increase upon the tip-in. This may be due to the second compressor already being able to provide the demanded boost due to being maintained at relatively high compressor speeds during nominal engine operation (e.g., no tip-in and/or gearshift). The first and second compressor speeds remain fairly constant after the boost demand.

At T5, the vehicle speed remains constant, the transmission gear remains in third gear, the first compressor speed and second compressor speed are fairly constant, and the electric compressor assist remains disabled. After T5, the vehicle speed remains constant, the transmission gear remains in third gear, the first compressor speed and second compressor speed are fairly constant, and the electric compressor assist remains deactivated.

By at least partially powering a compressor with an electric compressor assist from an electric motor, turbolag may be mitigated for a vehicle at an ambient altitude at or above a threshold vehicle altitude. The electric motor may be initiated independent of or in combination with compressor assist produced via a wastegate. Furthermore, as the vehicle altitude increases further beyond the threshold vehicle altitude, the electric compressor assist may increase and the wastegate compressor assist may decrease to further reduce turbolag.

The technical effect of using the electric motor to at least partially drive the compressor may be to mitigate sluggish engine performance for a vehicle at ambient altitudes at or above the threshold vehicle altitude. The electric motor may provide an electric compressor assist to compensate for low oxygen content of intake aircharge at the ambient altitudes at or above the threshold vehicle altitude. The electric motor may be applied during instances of low engine revolution (e.g., engine idle and/or a transmission gear shift) or low engine air flow. It is during low engine air flow conditions where the engine may not produce enough exhaust flow to power the turbine at a rate sufficient to provide a desired boost. By introducing the electric motor, the above mention problem may be circumvented and the desired boost may be provided even at low engine revolutions.

In this way, a method for a boosted engine comprises adjusting a ratio of turbocharger compressor assist provided from an electric motor relative to turbocharger turbine assist provided from an exhaust wastegate based on ambient altitude during engine idling conditions preceding an operator pedal tip-in event. The adjusting may further include the adjusting based on the altitude includes, as the altitude increases above a threshold, increasing compressor assist provided from the electric motor while correspondingly decreasing turbine assist provided from the exhaust wastegate. The method, additionally or alternatively, may include the compressor assist provided from the electric motor includes spinning the compressor via the electric motor, the motor driven using power from a system battery. The method may further include the wastegate compressor assist provided from the exhaust wastegate includes closing the wastegate to increase exhaust pressure upstream of the turbine. Additionally or alternatively, the method may further include the ratio is further adjusted based on a state of charge of the system battery, the compressor assist provided from the electric motor increased as the state of charge of the system battery exceeds a threshold.

The method may further comprise the boosted engine being coupled in a hybrid electric vehicle and wherein the system battery is a vehicle system battery of the hybrid electric vehicle. The method, additionally or alternatively, may further comprise in response to the operator pedal tip-in event, further increasing the compressor assist provided from the electric motor while decreasing compressor assist provided from the exhaust wastegate. The method may further comprise the ambient altitude is based on an output of either an ambient barometric pressure sensor or a navigation system. The method, additionally or alternatively, may further comprise increasing the ratio of compressor assist from the electric motor until the upshift/downshift is completed, and then increasing the ratio of compressor assist from the wastegate in response to a transmission gear upshift/downshift while operating at a higher than threshold ambient altitude.

Another method of a boosted engine may comprise adjusting an amount of motor assist provided to a turbocharger compressor from an electric motor based on vehicle altitude, and further based on the transmission gear shift during a transmission gear shift. The adjusting may further comprise increasing the amount of motor assist as the vehicle altitude increases above a threshold. Additionally or alternatively, the adjusting may further include providing more motor assist during a transmission downshift relative to a transmission upshift as the vehicle altitude increases above the threshold. The adjusting, additionally or alternatively, may further include providing more electric compressor assist when the transmission is shifted through a larger number of transmission gears and providing less motor assist when the transmission is shifted through a fewer number of transmission gears. The method, additionally or alternatively, may further comprise the electric motor being driven by a vehicle battery. An amount of electric compressor assist provided may further be adjusted based on a state of charge of the vehicle battery, the amount of motor assist decreased as the state of charge of the vehicle battery falls below a threshold charge. The method may further include not providing electric compressor assist during the transmission gear shift when the vehicle altitude is below the threshold. Additionally or alternatively, the method may include continuing to provide motor assist to the compressor during engine idling conditions following the transmission gear shift when the vehicle altitude is higher than a threshold.

A system of an engine may comprise an engine, an electric motor coupled to a battery, vehicle wheels driven by one or more of the engine and the motor, a transmission coupled between the engine and the vehicle wheels, a turbocharger for providing boosted intake air to the engine, the turbocharger including a compressor driven by a turbine, the compressor also configured to receive electric compressor assist from the electric motor, an exhaust wastegate coupled across the turbine, a navigational system, and a controller with computer readable instructions stored on non-transitory memory for receiving input regarding an altitude of vehicle operation from the navigational system. When the altitude is higher than a threshold, the controller may operate the electric motor during engine idling conditions or before an operator tip-in request is received, to maintain engine idling speed by providing electric compressor assist to the compressor, the amount of electric compressor assist provided to the compressor based on a difference of the altitude from the threshold, and concurrently decreasing an opening of the wastegate, the decreasing of the wastegate based on the amount of electric compressor assist provided to the compressor. The system, additionally or alternatively, may include while the altitude is higher than the threshold, operating the electric motor to provide electric compressor assist to the compressor while shifting a gear of the transmission, and discontinuing operation of the motor after the transmission gear shift is completed, wherein the amount of electric compressor assist provided to the compressor is based on whether the transmission gear shift request includes a request for a transmission upshift or a downshift, and further based on a degree of the gear shift responsive to a transmission gear shift request. The controller may further include instructions for decreasing electric compressor assist provided to the compressor during any of the engine idling conditions and the transmission gear shift in response to a state of charge of the battery falling below a threshold charge.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle having a turbocharged engine, comprising:
   during a transmission gear shift, adjusting an amount of motor assist provided to a turbocharger compressor from an electric motor based on vehicle altitude, and further based on the transmission gear shift;
   wherein the adjusting includes increasing the amount of motor assist as the vehicle altitude increases above a threshold, the method further comprising adjusting the amount of motor assist responsive to a clutch depression, and
   wherein the adjusting further includes providing increased motor assist during a transmission upshift relative to a transmission downshift as the vehicle altitude increases above the threshold, wherein the vehicle altitude is determined based on one or more of a navigational system and a barometric pressure.

2. The method of claim 1, where adjusting the amount of motor assist provided to the turbocharger compressor from the electric motor is further based on a state of charge (SOC) of a battery of the hybrid vehicle.

3. The method of claim 1, further comprising, increasing the motor assist responsive to a tip-in event.

4. The method of claim 3, further comprising decreasing an opening of a wastegate responsive to the tip-in event.

5. The method of claim 1, further comprising gradually opening a wastegate during the transmission downshift.

6. The method of claim 1, further comprising closing a wastegate to increase an exhaust pressure upstream of the turbine as the vehicle altitude increases.

7. The method of claim 1, further comprising continuing to provide motor assist to the compressor during engine idling conditions following a transmission gear shift when the vehicle altitude is higher than the threshold.

8. A method for a hybrid vehicle having a turbocharged engine, comprising:
   during a transmission gear shift, adjusting an amount of motor assist provided to a turbocharger compressor from an electric motor based on vehicle altitude, and further based on the transmission gear shift;
   wherein the adjusting includes increasing the amount of motor assist as the vehicle altitude increases above a threshold, the method further comprising adjusting the amount of motor assist responsive to a clutch depression, and
   wherein the adjusting further includes providing increased motor assist to the compressor when a transmission is shifted through a larger number of transmission gears and providing less motor assist when the transmission is shifted through a fewer number of transmission gears.

9. The method of claim 8, where adjusting the amount of motor assist provided to the turbocharger compressor from the electric motor is further based on a state of charge (SOC) of a battery of the hybrid vehicle.

10. The method of claim 8, further comprising monitoring a turbine speed based on the electric motor.

11. The method of claim 10, further comprising, if the turbine speed exceeds a threshold turbine speed, employing the electric motor as a brake to decrease the turbine speed.

12. The method of claim 8, further comprising increasing the amount of motor assist responsive to a tip-in event.

13. The method of claim 12, further comprising decreasing an opening of a wastegate responsive to the tip-in event.

14. The method of claim 8, further comprising increasing an opening of a wastegate as the amount of motor assist is increased.

15. The method of claim 8, further comprising continuing to provide motor assist to the compressor during engine idling conditions following the transmission gear shift.

16. A method for a hybrid vehicle having a turbocharged engine, comprising:
   during a transmission gear shift, adjusting an amount of motor assist provided to a compressor of a turbocharger from an electric motor based on vehicle altitude, and further based on the transmission gear shift;
   wherein the adjusting includes increasing the amount of motor assist as the vehicle altitude increases above a threshold, the method further comprising adjusting the amount of motor assist responsive to a clutch depression, wherein an electric motor is driven by a vehicle battery, and wherein the amount of motor assist provided is further adjusted based on a state of charge of the vehicle battery, the amount of motor assist decreased as the state of charge of the vehicle battery falls below a threshold charge.

17. The method of claim 16, further comprising continuing to provide motor assist to the compressor during engine idling conditions following the transmission gear shift.

18. The method of claim 16, further comprising, if a turbine speed of a turbine of the turbocharger exceeds a threshold turbine speed, employing the electric motor as a brake to decrease the turbine speed.

19. The method of claim 16, wherein the compressor of the turbocharger is operated by the electric motor in conjunction with a turbine of the turbocharger.

20. The method of claim 19, wherein, in response to a tip-in event, an opening of a wastegate is decreased to increase exhaust pressure upstream the turbine of the turbocharger.

\* \* \* \* \*